United States Patent
Sharma et al.

(10) Patent No.: US 7,274,803 B1
(45) Date of Patent: Sep. 25, 2007

(54) METHOD AND SYSTEM FOR DETECTING CONSCIOUS HAND MOVEMENT PATTERNS AND COMPUTER-GENERATED VISUAL FEEDBACK FOR FACILITATING HUMAN-COMPUTER INTERACTION

(75) Inventors: Rajeev Sharma, State College, PA (US); Nils Krahnstoever, State College, PA (US); Emilio Schapira, State College, PA (US)

(73) Assignee: VideoMining Corporation, State College, PA (US)

( * ) Notice: Subject to any disclaimer, the term of this patent is extended or adjusted under 35 U.S.C. 154(b) by 784 days.

(21) Appl. No.: 10/403,234

(22) Filed: Mar. 31, 2003

Related U.S. Application Data (60) Provisional application No. 60/369,279, filed on Apr. 2, 2002.

(51) Int. Cl.
  *G06K 9/00* (2006.01)
  *G06K 9/34* (2006.01)
  *H04N 7/14* (2006.01)
  *H04N 7/18* (2006.01)
  *H04N 9/47* (2006.01)

(52) U.S. Cl. .............. 382/107; 382/103; 382/128; 382/154; 382/164; 348/14.15; 348/143; 348/152

(58) Field of Classification Search ............ 382/103, 382/107, 128, 130, 154, 162, 164, 173, 190; 348/14.15, 14.16, 142, 143, 152
See application file for complete search history.

(56) References Cited

U.S. PATENT DOCUMENTS

| | | | | |
|---|---|---|---|---|
| 5,072,294 A | * | 12/1991 | Engle | 348/172 |
| 5,459,793 A | * | 10/1995 | Naoi et al. | 382/165 |
| 5,473,369 A | * | 12/1995 | Abe | 348/169 |
| 5,715,325 A | * | 2/1998 | Bang et al. | 382/118 |
| 5,748,776 A | * | 5/1998 | Yoshida | 382/195 |
| 6,104,864 A | * | 8/2000 | Kondo et al. | 348/137 |
| 6,205,231 B1 | | 3/2001 | Isadore-Barreca et al. | |

(Continued)

FOREIGN PATENT DOCUMENTS

WO   WO-02/07839 A2   1/2002

OTHER PUBLICATIONS

Freeman et al., "Television control by hand gestures" IEEE Intl. Wkshp. on Automatic Face and Gesture Recognition, Zurich, Jun. 1995.*

(Continued)

*Primary Examiner*—Bhavesh M Mehta
*Assistant Examiner*—Manav Seth (57) ABSTRACT

The present invention is a system and method for detecting and analyzing motion patterns of individuals present at a multimedia computer terminal from a stream of video frames generated by a video camera and the method of providing visual feedback of the extracted information to aid the interaction process between a user and the system. The method allows multiple people to be present in front of the computer terminal and yet allow one active user to make selections on the computer display. Thus the invention can be used as method for contact-free human-computer interaction in a public place, where the computer terminal can be positioned in a variety of configurations including behind a transparent glass window or at a height or location where the user cannot touch the terminal physically.

10 Claims, 12 Drawing Sheets

U.S. PATENT DOCUMENTS

| | | | |
|---|---|---|---|
| 6,263,088 | B1 | 7/2001 | Crabtree et al. |
| 6,272,250 | B1 | 8/2001 | Sun et al. |
| 6,283,860 | B1 * | 9/2001 | Lyons et al. .................. 463/36 |
| 6,363,160 | B1 | 3/2002 | Bradski et al. |
| 6,394,557 | B2 | 5/2002 | Bradski |
| 6,396,476 | B1 | 5/2002 | Bradski et al. |
| 6,404,900 | B1 * | 6/2002 | Qian et al. ................... 382/103 |
| 6,434,255 | B1 * | 8/2002 | Harakawa ................... 382/103 |
| 6,996,460 | B1 * | 2/2006 | Krahnstoever et al. ........ 701/1 |
| 2001/0000025 | A1 | 3/2001 | Darrell et al. |
| 2002/0126876 | A1 * | 9/2002 | Paul et al. ................... 382/104 |

OTHER PUBLICATIONS

Moeslund T.B., et al.,4th IEEE Int. Conf. Automatic Face and Gesture Rec., 2000, p. 362-367.

Goncalves L., et al., Proc. International Conference on Computer Vision. 1995. p. 764-770.

Filova V., et al., Machine Vision and Application, 1998. 10: p. 223-231.

Wu A., et al., 4th IEEE Int. Conf. Automatic Face and Gesture Rec., 2000. p. 536-5.

Ahmad S., A Usable Real-Time 3D Hand Tracker, IEEE Asian Conference. 1994.

Struman D.J., et al., Proc. ACM SIGGRAPH Symposium on User Interfaces, 1989, VA. p. 19-24.

Davis J. et al., Proc. of the 28th asilomar conference on signals, systems, and computer. 1994.

R. A. Bolt, SIGGRAPH '80 Proceedings, vol. 14, 1980.

Freeman W.T., et al., IEEE Computer Graphics and Applications, vol. 18, Issue3, p. 42-53,May-Jun. 1998.

N. Krahnstoever, et al., IEEE Workshop on Applications of Computer Vision, Orlando,FL,Dec. 3-4, 2002.

N. Krahnstoever, et al, 4th Int. Conf. Multimodal Interfaces(ICMI'2002), Pittsburgh,Oct. 14-16, 2002.

Reeves, W. T., Particle Systems—a Technique for Modeling a Class of Fuzzy Objects, ACM Trans. Graph. 2, 2 (Apr. 1983), 91-108.

* cited by examiner

METHOD AND SYSTEM FOR DETECTING CONSCIOUS HAND MOVEMENT PATTERNS AND COMPUTER-GENERATED VISUAL FEEDBACK FOR FACILITATING HUMAN-COMPUTER INTERACTION

CROSS-REFERENCE TO RELATED APPLICATIONS

This application is entitled to the benefit of Provisional Patent Application Ser. No. 60/369,279, filed Apr. 2, 2002.

FEDERALLY SPONSORED RESEARCH

Not Applicable

SEQUENCE LISTING OR PROGRAM

Not Applicable

BACKGROUND OF THE INVENTION

Field of the Invention

The present invention relates to a system and method for detecting and analyzing motion patterns of individuals present at a computer vision-enabled multimedia terminal and the method of providing visual feedback of the extracted information to aid the contact-free human-computer interaction process between a user and the system.

BACKGROUND OF THE INVENTION

There is a significant need in the art for a system and method for robustly tracking human body motion and to develop means of providing suitable visual feedback of said human movements during an interaction process with a multimedia the system controlled by said human motions.

Prior Art

Several video tracking systems are well known in the art. However, video tracking systems heretofore known, lack many of the functional, performance and robustness capabilities as the present invention.

The methods of Bradski, U.S. Pat. No. 6,394,557 and U.S. Pat. No. 6,363,160, are based on using color information to track the head or hand of a person in the view of a single camera. It is well known, that the use of only color information in general is insufficient to track small, fast moving objects in cluttered environment, their method is hence much less general and only workable in certain specialized environments. No advanced feedback mechanism is in place to improve the interaction between a user and the system.

The method of Crabtree et. al, U.S. Pat. No. 6,263,088, is also based on a single camera and designed to track people in a room seen from above. The concept of track feedback visualization does not apply to their application.

The method of Qian et. al, U.S. Pat. No. 6,404,900, is designed to track human faces in the presence of multiple people. The method is highly specialized to head tracking, making it unsuitable for alternative application domains and targets, such at human hands. No advanced feedback mechanism is in place to improve the interaction between a user and the system.

The method of Sun et. al, U.S. Pat. No. 6,272,250, is also based on a single camera or video and requires an elaborate color clustering approach, making their method computationally expensive and not suitable for tracking general targets in 3D.

The method of Harakawa, U.S. Pat. No. 6,434,255, utilizes two video sensors, and requires specialized infrared cameras. Furthermore, additional hardware is required to provide infrared illumination of the user. Finally, the system needs a large mechanized calibration apparatus that involves moving a large marking plate through the space that is later occupied by the user. During the calibration procedure, the movement of the plate has to be precisely controlled by the computer.

The method of Hildreth et. al, International Patent. WO 02/07839 A2, determines the 3D locations of objects in the view of multiple cameras by first extracting salient features from each image and then to pair up these two sets to find points in each of the two images that correspond to the same point in space. Their method does not work with only a single camera.

The method of Darrell et. al, US 2001/0000025 A1, is also based on two cameras and is faced with exactly the same challenges as the above described method of Hildreth et. al.

The method of Moeslund et. al, "Multiple Cues used in Model-Based Human Motion Capture", in Fourth IEEE International Conference on Automatic Face and Gesture Recognition, 2000, p. 362-367, utilizes color segmentation of the hand and the head and requires the use of two cameras. In addition, their approach fails if the segments of head and hand come too close to each other.

The methods of Goncalves et. al, "Monocular tracking of the human arm in 3D", in Proc. International Conference on Computer Vision, 1995, p. 764-770, and Filova et. al, "Automatic reconstruction of 3D human arm motion from a monocular image sequence", Machine Vision and Application, 1998, 10: p. 223-231, perform model based tracking of a human arm in a single camera view. This approach obtains 3D information even in a single camera image, which yields robust tracking, potentially making feedback visualization unnecessary. However, model based tracking as described in their paper is computationally extremely expensive and not suitable for practical application. Furthermore, the operating conditions are very constrained requiring the person whose arm is tracked to assume a very specific pose with respect to the camera.

The method of Wu et. al, "A Virtual 3D blackboard: 3D finger tracking using a single camera", in Fourth IEEE International Conference on Automatic Face and Gesture Recognition, 2000, p. 536-542, is also a model-based approach and requires the detection of a users elbow and shoulder, which is difficult to perform outside of very constrained environments. More specifically, their method is based on skin color cues and implicitly assumes that the user, whose arm is being tracked, wears short-sleeved shirts, thus very much limiting the domain in which their method would be useful.

The method of Ahmad, "A Usable Real-Time 3D Hand Tracker", IEEE Asian Conference, 1994, is able to track a human hand held between a camera and a table, where the camera is pointed at the table with the imaging sensor parallel to the table surface. Their method is very specific in that it is only usable in a situation where the user, whose hand is being tracked, is sitting at a table with his hand at a particular location held in a particular pose and thus lacks generality. No advanced feedback mechanism is in place to improve the interaction between a user and the system.

The method of Struman et. al, "Hands-on Interaction With Virtual Environments", in Proceedings of the ACM SIG- GRAPH Symposium on User Interfaces, 1989: Williamsburg, Va. p. 19-24, also discusses contact free interaction with a virtual environment. However, their method requires the user to wear a special data glove whose 3D position is sensed through non-visual means. Their method is hence less general than our method and the concept of track feedback visualization does not apply.

The method of Davis et. al, "Determining 3-D Hand Motion", Proceedings of the 28th asilomar conference on signals, systems, and computer, 1994, discusses tracking a person's hand in 3D based on a single camera view. The method models the fingertips and assumes a clear planar top view of the hand with the fingers stretched out. This type of hand tracking would not be applicable for the type of applications aimed at in this patent and no feedback mechanism is discussed.

In a very early work, Bolt, "'put-that-there': Voice and gesture at the graphics interface", In SIGGRAPH '80 Proceedings, volume 14, 1980, presented a virtual interactive environment. Interaction was performed via two joysticks rather then using vision-based approaches, which eliminates the need for advanced feedback visualization.

The method of Freeman et. al, "Computer Vision for Interactive Computer Graphics", IEEE Computer Graphics and Applications, Vol. 18, Issue 3, pp. 42-53, May-June 1998, utilizes a 2D template based approach for interacting with a television display. They explicitly mention the use of feedback for their application, but only display a simple hand cursor at the location of the hand as perceived by the system. Their approach hence only maintains a single hand location hypothesis and therefore lacks the robustness offers by the work disclosed in this patent.

In Krahnstoever et. al, "Multimodal Human Computer Interaction for Crisis Management Systems," IEEE Workshop on Applications of Computer Vision, The Orlando World Center Marriott Orlando, Fla. USA, Dec. 3-4, 2002, and Krahnstoever et. al, "A Real-Time Framework for Natural Multimodal Interaction with Large Screen Displays," Fourth International Conference on Multimodal Interfaces (ICMI '2002), Pittsburgh, Pa. USA, Oct. 14-16, 2002, a large screen interactive system is presented by Krahnstoever et. al, which also utilizes single camera head and hand tracking. However, as the previous method, only a single hand location hypothesis is estimated and no advanced visual feedback is provided.

SUMMARY

The present invention operates to process a sequence of input images received from a camera monitoring one or multiple users in front of, for example, a large screen information access terminal. In a preferred embodiment, the present invention collects data that is useful for analyzing and managing user interaction with an information access terminal.

The present invention is directed to a system and method for detecting human movement patterns such as hand and arm movements with respect to an information terminal by generating a sequence of video frames containing images of the user. The image information in the video frames is processed by a processor, such as a computer, to identify regions of the video frame representing a user or body parts of a user such as the arm(s) or hand(s).

The obtained region information is processed to obtain estimates of the location of the user's body parts of interest in the view of the camera which can be used in the interaction process by mapping the obtained location information to the video screen on the terminal in a form similar to a mouse pointer commonly used in graphical user interfaces but in a way that takes uncertainty of the obtained location information into consideration.

The invention is the methodology for extracting the location information and the associated visual display of the location information that provides effective visual feedback to the user about the user's body part location as perceived by the processing unit and the uncertainty that the processing unit associates with this location. The feedback of location information and uncertainty information is essential for providing the user with a satisfactory interaction experience.

The above and other objects and advantages of the present invention will become more readily apparent when reference is made to the following description, taken in conjunction with the following drawings.

DETAILED DESCRIPTION OF THE INVENTION

A preferred embodiment of the invention is now described in detail. Referring to the drawings, like numbers indicate like components and/or steps throughout the views.

Figure 1:
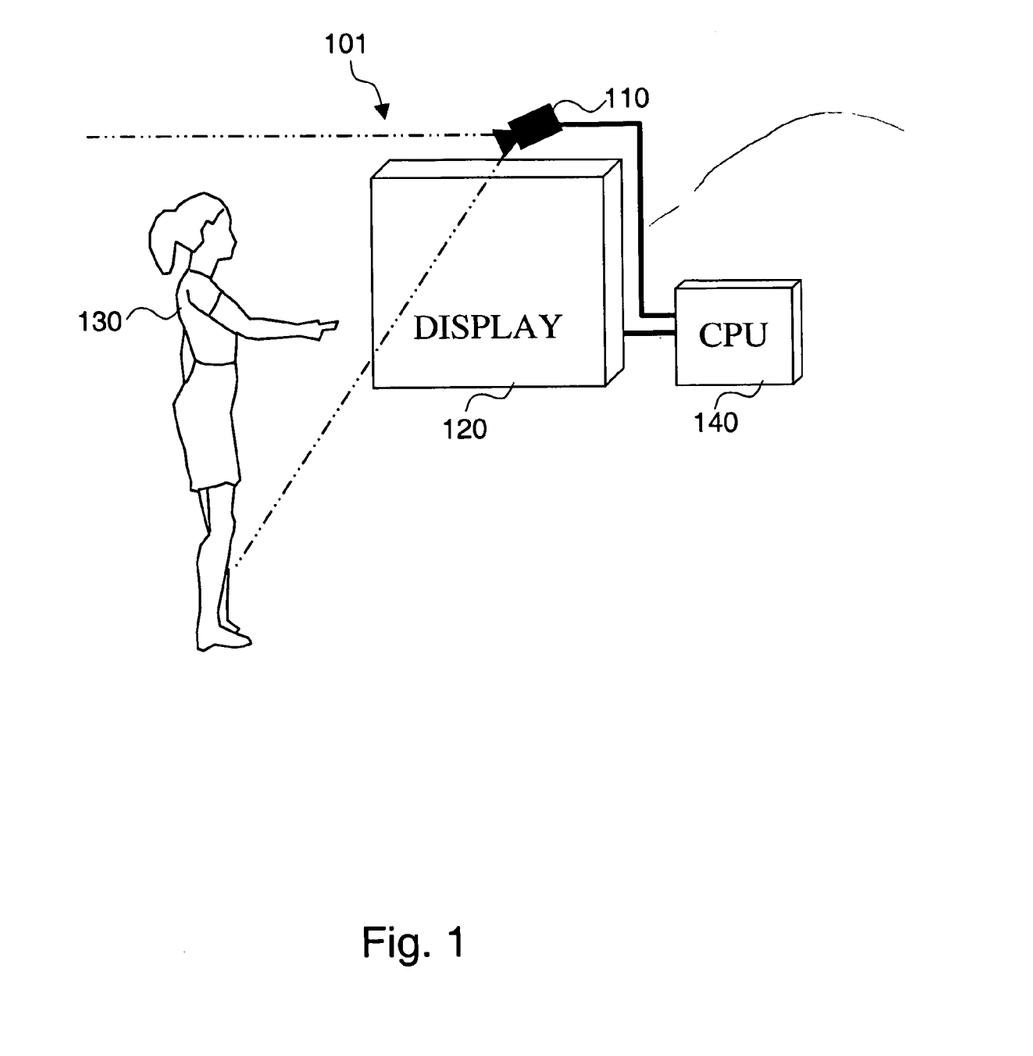
FIG. 1—Figure of the overall system.

FIG. 1 shows the overall system that provides the hardware and application context for the present invention. The hardware components of the system consist of a display terminal 120, preferably a large screen display, that displays information or multi-media content to the user 130 standing at a distance that allows comfortable viewing of the displayed information. The information that is displayed is supplied by a central processing unit (CPU) 140, such as a computer. A video camera 110 that can also be coupled to the central processing unit 140 is preferably mounted on top of the display terminal 120 and is directed at a location where the user 130, in the view of the camera 101, would normally stand to view the display terminal 120. All components are non-customized off-the-shelf hardware components; for example, video camera 110 can comprise a SONY EVI D30 Pan-Tilt camera; display terminal 120 can comprise a SONY LCD Projection Data Monitor KL-X9200; and CPU 140 can comprise a DELL Precision 420 Workstation. A physical enclosure (not shown) that contains the components 110, 120 and 140 can be provided if desired; such enclosure would typically be custom made and could be configured in numerous shapes and sizes.

Figure 2:
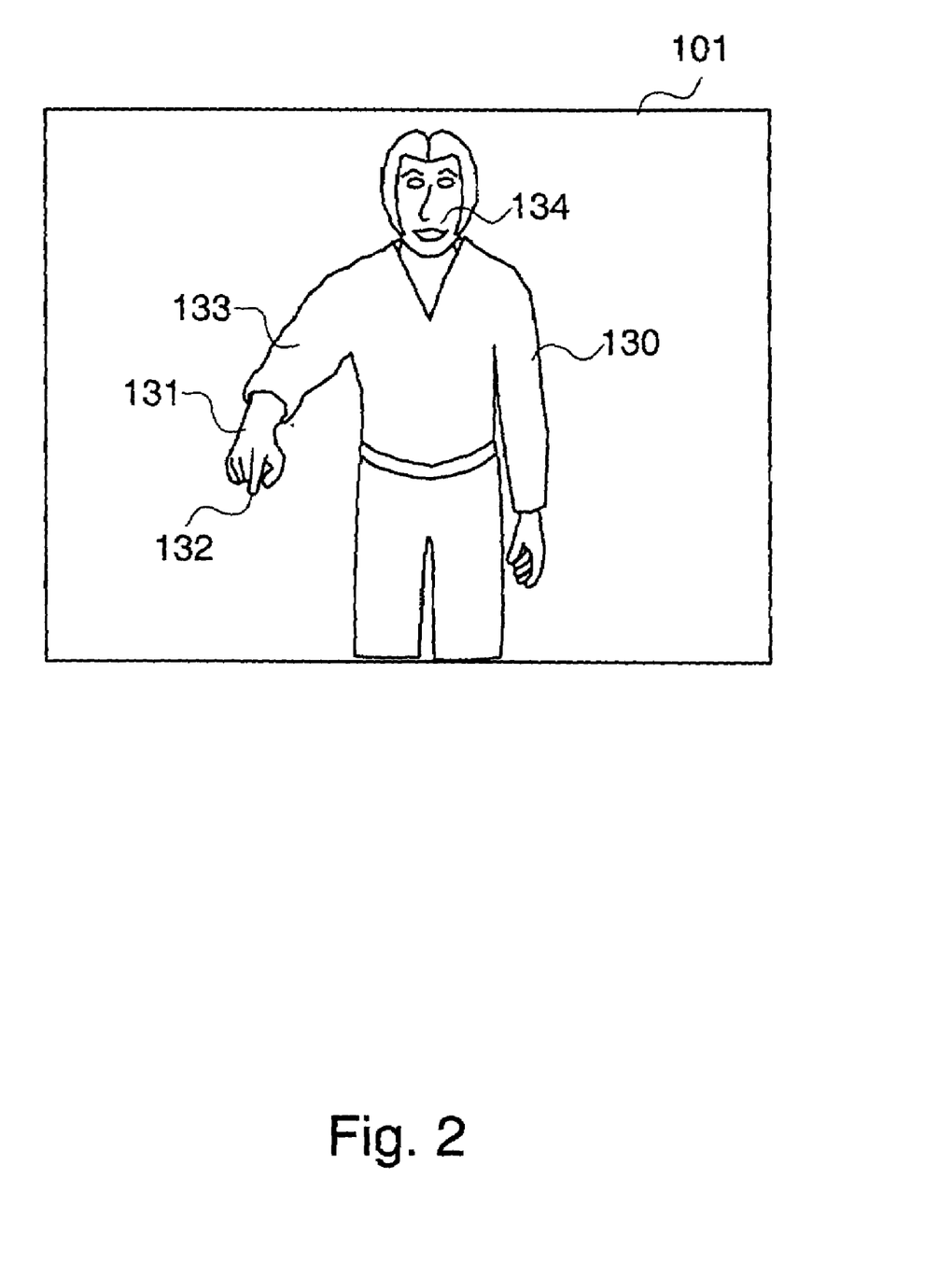
FIG. 2—View of the user as seen by the system.

A typical view 101 that the camera 110 acquires of the user 130 is shown in FIG. 2. The camera 110 can capture an image of the entire user 130 or might only capture an image of the upper body of the user 130 as shown in FIG. 2. The user 130 is able to interact with the multi-media content displayed on the display terminal 120 using body gestures that can consist of gestures with the (e.g., right) hand 131 or the arm 133. The user might use the index finger 132 to point at items displayed on the display terminal screen 120. Since the system can detect the presence of the user 130 by detection his or her face in front of the display, a view of the user's face 134 can be required.

Figure 3:
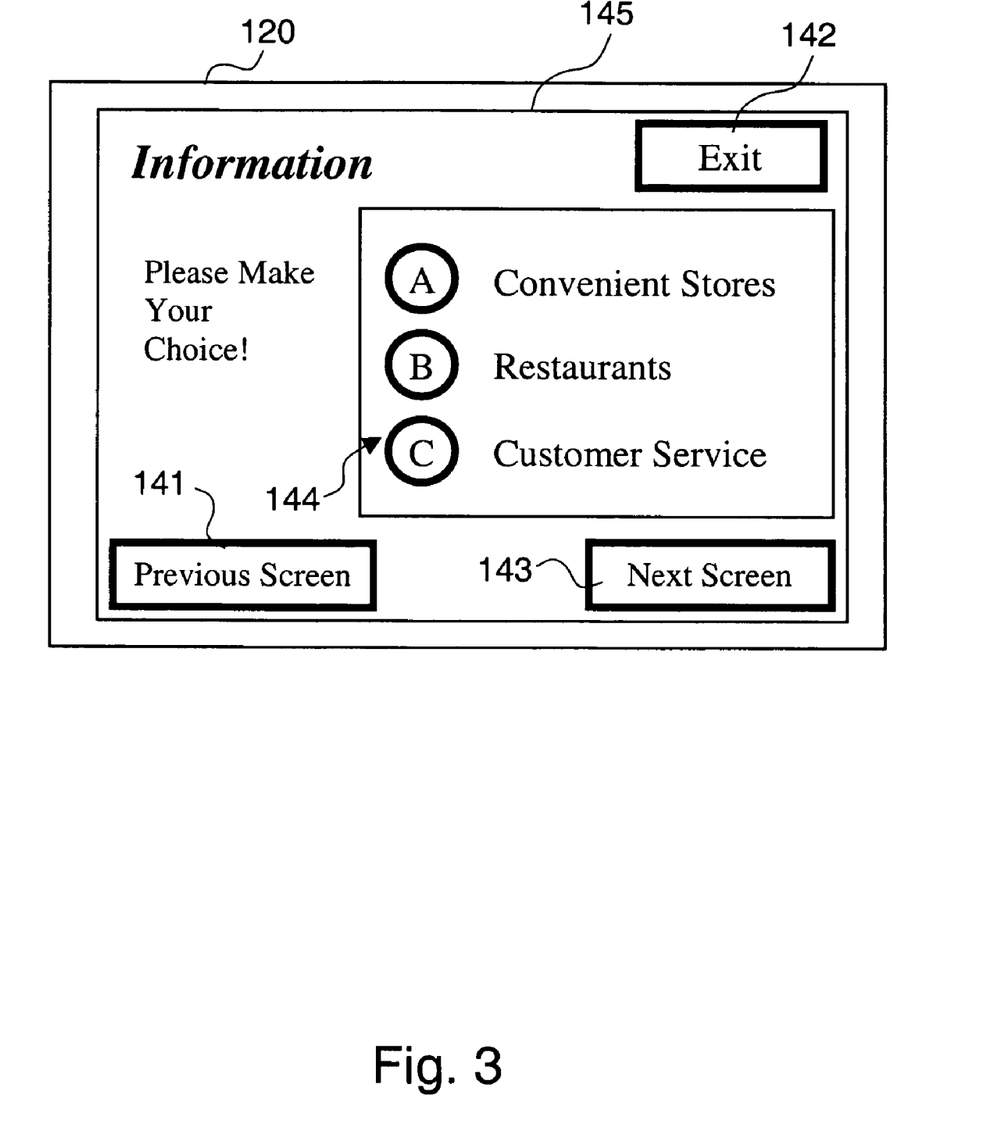
FIG. 3—View of the system as seen by the user.

FIG. 3 shows an example display of information that can be shown on the display terminal 120 as seen by the user 130. The information is presented in the form of text, graphics, videos and/or computer animations. The display might include navigational features such as buttons 141-144 that allow the user 130 to make selections 144, indicate desired actions 142 or to navigate to other parts of the application 141 and 143, all of which represent typical content found on an interactive display.

Figure 4:
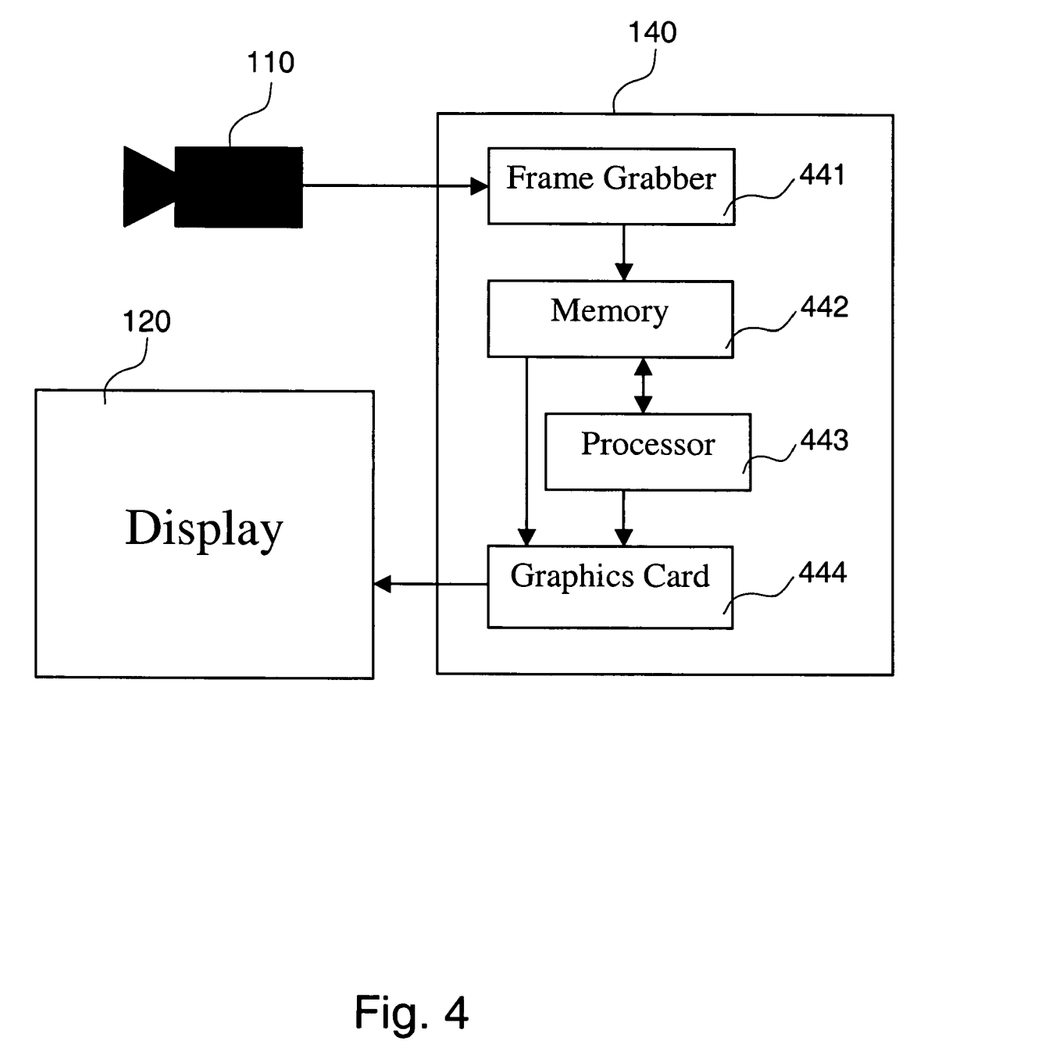
FIG. 4—Flow of information.

In the following, the processing and visualization components are described in more detail with reference to FIG. 4. The camera 110 is connected to the (CPU) 140. The signal of the camera (typically NTSC or PAL) is converted to binary data for processing by CPU 140. This conversion is achieved by a conventional frame grabber 441 that can comprise MATROX Meteor-II frame grabber and that is typically a component directly integrated in connected to the CPU 140. A processor 443 can comprise a processor (e.g., an Intel Pentium III processor) found in an industry standard personal computer (PC) running a conventional operating system (e.g., the Microsoft Windows 2000® operating system). The individual functions of the overall system are preferably implemented by a software program that may be installed in the memory 442 of the computer, stored on CD-ROM, floppy disk(s), hard disk, etc., or it may be downloaded via a network or satellite connection or reside in system ROM. The system is implemented by several software modules (that can comprise modules developed using the C++ programming language using the C++ Microsoft Visual Studio Development system Version 6.0) each compromising a plurality of executable instructions which, when stored in memory 442, cause the processor 443 to perform the processes shown and described hereinafter. However, one with ordinary skills in the art will appreciate that several components of the system could be implemented by one or more application specific integrated circuits, digital signal processors or other suitable signal processing architectures.

The camera signal is converted into digital images of sizes typically 640×480 or in general Width×Height picture elements (pixels). The converted images are transferred into the memory 442 where they are processed by the processor 443 and the desired information about the user's presence and actions (e.g., hand and arm gestures as described above) is extracted. This information is used to detect selection and pointing events that can be used as human-computer interaction events, similar to the way that a mouse device can make selections and point at items on a computer screen. The application that is running on the processing unit uses the user activity information to manage the displayed content, which is sent to a graphics card 444 that can comprise an ATI Technologies Inc., Fire GL2 graphics card connected to the display terminal 120.

The system needs to obtain dynamic body pose parameters from the user as seen by the camera. These pose parameters consist preferably of the 3D (x,y,z) location of the user's hand and pointing direction (described by two angles) with respect to a global system coordinate frame. The system could also extract only the 2D (x,y) location of, for example, the user's hand in the view of the camera.

If the extracted 2D or 3D information is inaccurate or there is some inaccuracy in the systems calibration, the spatial correspondence between user's movements (such as hand or pointing gestures) and elements on the screen can be degraded or lost. This intuitively leads to situations in which the user is pointing at an item at the screen, but the processing unit "sees" (perceives that) the user pointing at a different location. Hence it is desirable to provide the user with visual feedback about the current state of the body part detection procedure by, for example, displaying a graphical element such as an iconic hand symbol or mouse pointer on the display terminal 120 on top of the information content. This visual feedback is analogous to the feedback that a user is given in graphical user interfaces on a PC operated with a mouse. There is no direct spatial correspondence of the location of the computer mouse with the location on the computer screen that the user would like to reach. However, by providing visual feedback in the form of a mouse pointer, a user applies subconsciously a mapping between the movements of the hand that operates the mouse and the desired movements of the mouse pointer.

One with skills in the art will appreciate the difficulties of extracting reliable location information about a user's body part in the view of a single camera by a computer program. Several factors can distract and confuse a computer program and cause erroneous judgments to be made that can lead to a deteriorated user experience and ultimately in a dissatisfied and frustrated user. In the following explanation, the body part "hand" is used as an example of a body-part that the system might use for the interaction process, but can also mean "hands", "arm", "head", "finger", etc.

It is in general difficult to utilize higher-level domain knowledge of human anatomy, shape and appearance in extracting the desired information. These factors, while easily utilized by humans to locate another person's hand, show large variability that are not easily discerned from non-hand objects by a computer program operating on standard video data. Computer programs commonly use indirect features such as color or motion information to detect and track a user's hand. This approach can be distracted by items in an image such as those shown in FIG. 5. A background object 150 that has the same color as the user's hand 131 can cause the processing unit to confuse object 150 with the actual hand 131 of the user. This event is commonly called a false negative (FN) in the art. Other FN's can be caused by, for example, the user's own face 134, or by standers 135 that do not interact with the system but might still be visible in the view of the camera.

Figure 5:
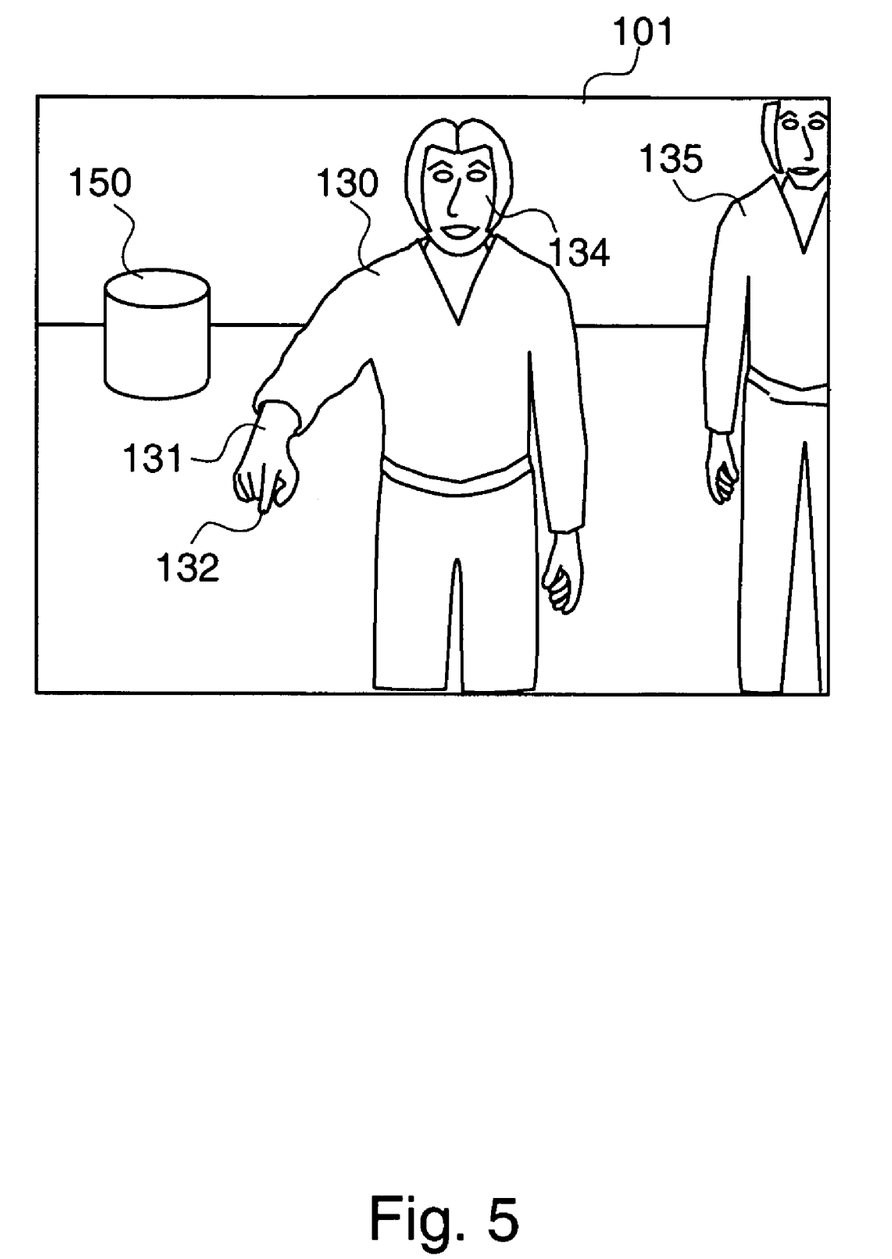
FIG. 5—Uncertainty factors that can lead to ambiguities.

Due to these challenges, the system can encounter FN detections of for example the object 150 with the hand 131, without the system having any knowledge about this FN confusion. The present invention, among other things, presents an innovative way of providing the user with a special kind of visual feedback about the current state of the system's "body part detected" procedure. This visual feedback puts the responsibility for judging the current "body part detected" status, especially with respect to a FN situation, on the user, who is able to make an intuitive and sub-conscious decision and adjust his or her movement patterns to help the system to recover.

Figure 6:
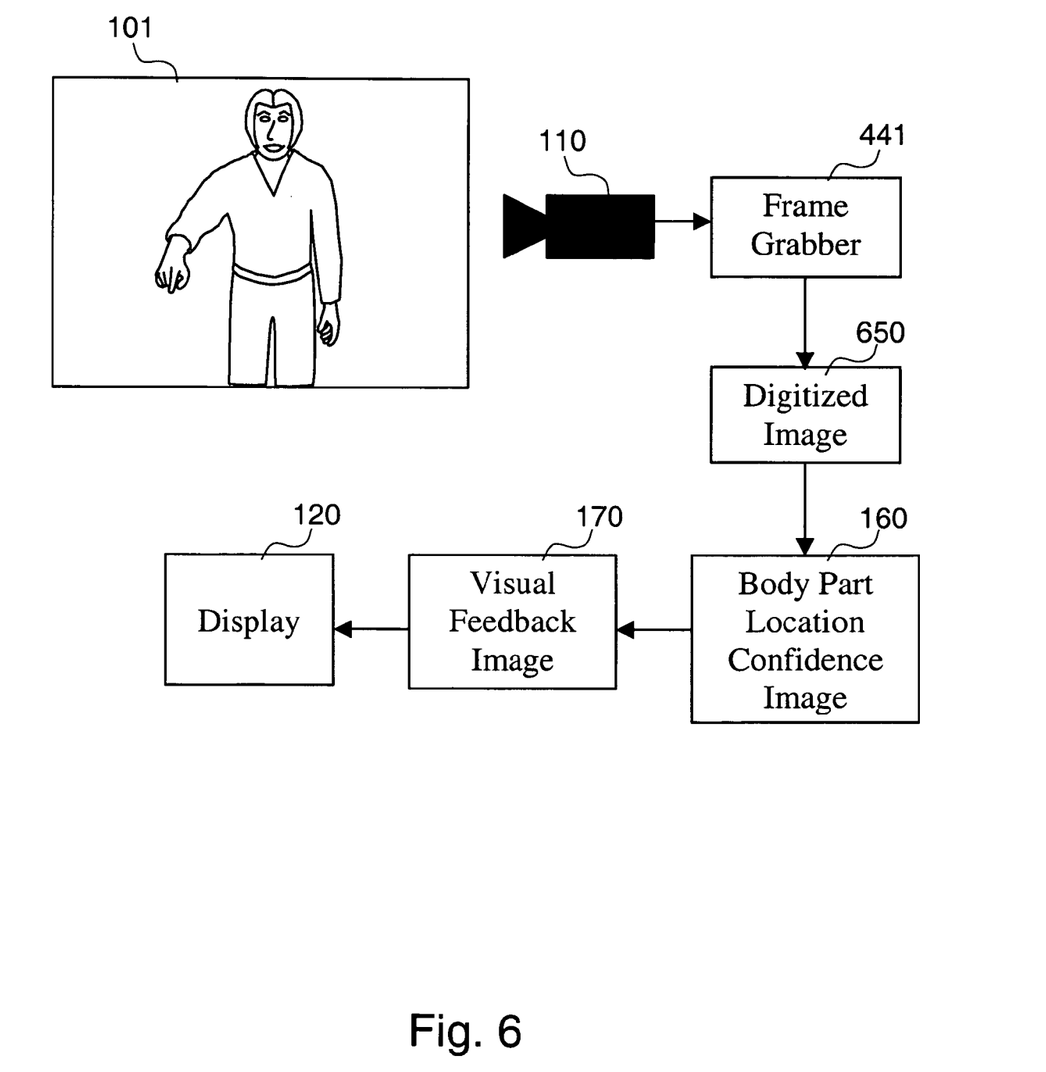
FIG. 6—Activity extraction from video frames.

FIG. 6 shows the overall processing pipeline of the system. The camera 110 captures a video stream of the user 130 interacting in front of the display 120. The video stream is digitized by the frame grabber 441, which yields a digitized image 650. From this image an auxiliary image is generated (described hereinafter) by the processor that gives, for every image location, a measure of the systems confidence that the desired body part is present at that location in the screen. This confidence image contains pixels of value between zero and one with high values denoting high confidence and low values denoting low confidence. For example a scene as shown in FIG. 5 would give high confidence values to the hand 131 of the user 130 and potentially medium values to other items such as the background object 150 or body parts of bystanders 135. From this image, suitable visual feedback in the form of an additional visual feedback image 170 is generated in an innovative way (described hereinafter) and displayed on display terminal 120, to guide the user's interaction process with the system.

Figure 7:
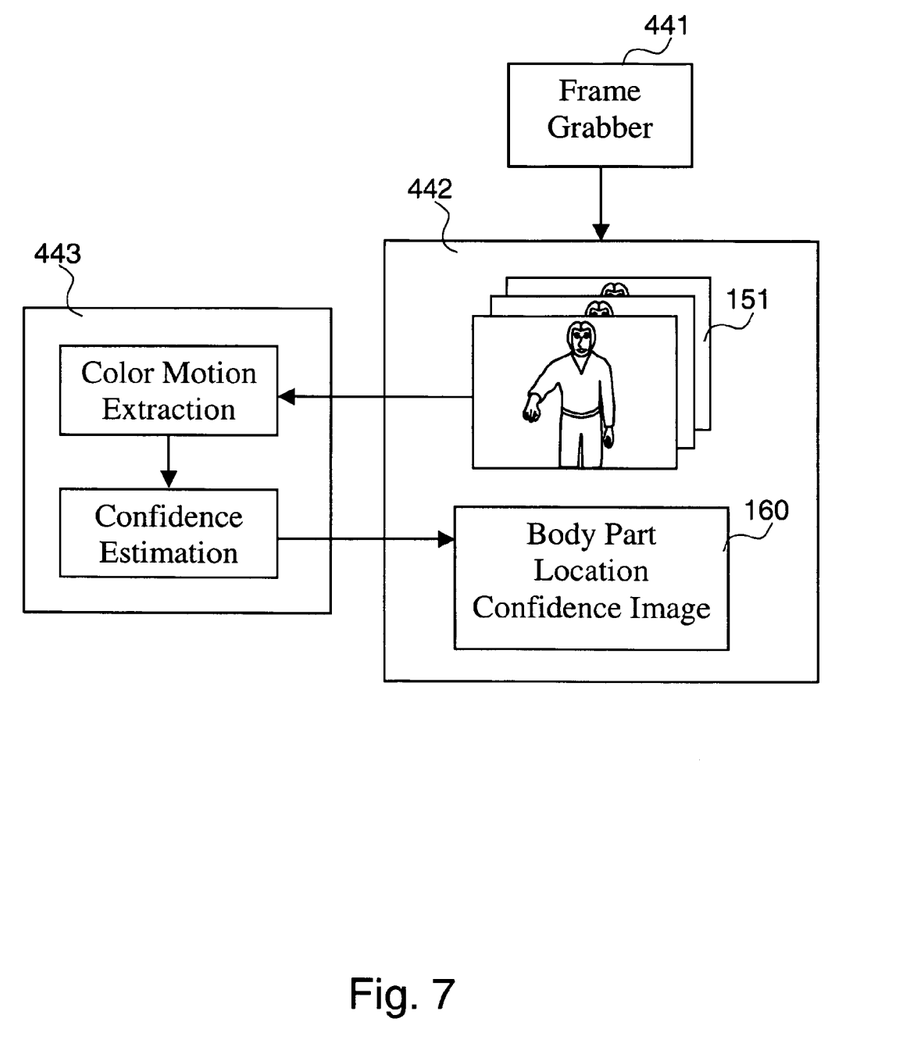
FIG. 7—Body part location confidence image generation.

FIG. 7 shows a preferred embodiment of the process that generates the body part location confidence image (BPLCI) 160 from the stream of digitized video images 151 provided by the frame grabber 441. The frame grabber 441 stores the digitized images in memory 442 that can then be accessed by the processor 443, which generates the BPLCI from this data as described hereinafter. The processor operates in two stages. In the first step, described below with reference to FIG. 8, a motion energy image (MEI) 161 and a color segmentation image (CSI) 162 are generated. In the second step, described below with reference to FIG. 9, these two images are combined to yield the BPLCI At a given time t, the memory contains digitized video images $I_t$ for time t 152 and a previous $I_{t-1}$ for a time slice t-1 153. These two images are analyzed to yield the MEI and the CSI. The MEI image contains pixels of value between zero and one with high values denoting high confidence and low values denoting low confidence that the observed motion that occurred between images 152 and 153 was caused by the desired body part. The CSI image contains pixels of value between zero and one with high values denoting high confidence and low values denoting low confidence that the observed color in the 152 arises from the desired body part. In the presented embodiment of the invention, these motion oriented and color oriented pixel confidence are calculated as follows:

Given a second order statistical color model of the hand color with average color $\mu \in \mathfrak{R}$ and covariance matrix $\Sigma \in M$ (3×3, $\mathfrak{R}$). This color model can originate from a skin color sample representing the average population, a skin color sample extracted from the user, e.g., during and initialization phase, or originate from an adaptive skin color extraction procedure. A pixel at location x in the image at time t 152 is now assigned a confidence according to the equation:

$$CSI'_t(x) = e^{-\frac{1}{2}(I_t[x]-\mu)^T \Sigma^{-1}(I_t[x]-\mu)} \quad (1.1)$$

This image has values equal to one for pixels that correspond very well to the average skin color and goes towards zero for pixels that show poor correspondence.

Figure 8:
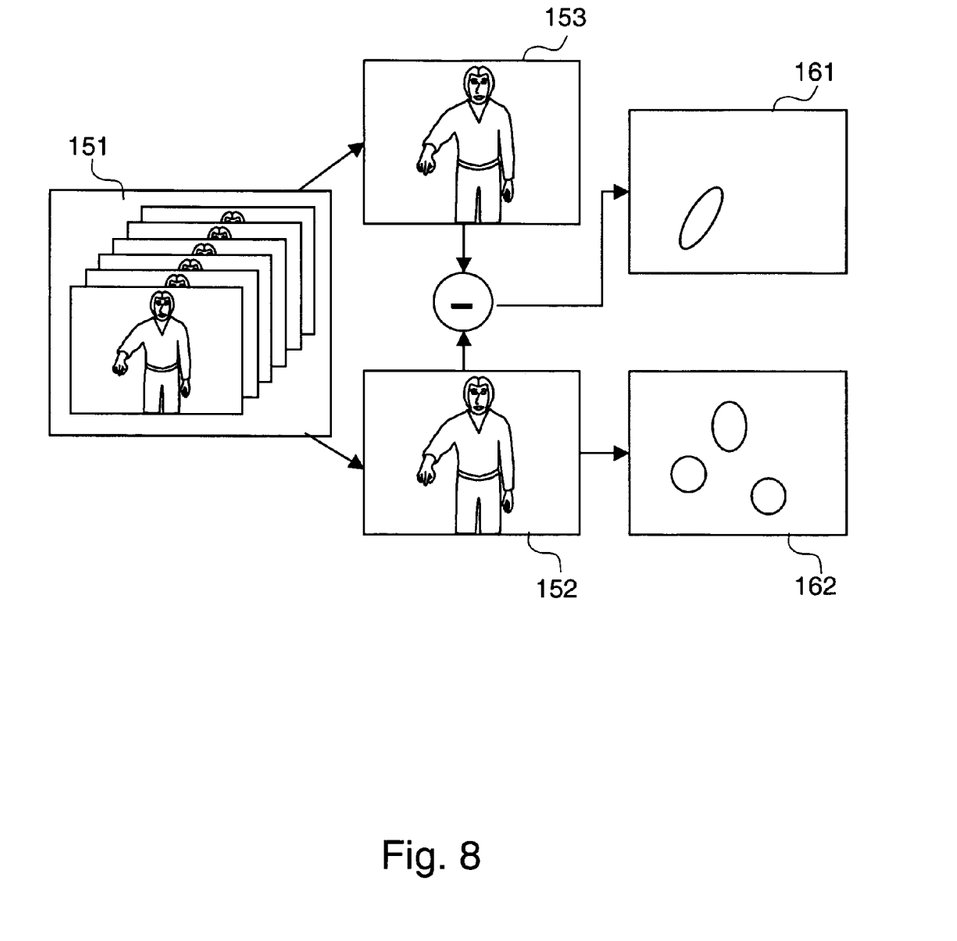
FIG. 8—Color motion extraction.

The MEI 161 is calculated as follows: For each pixel x from $I_t$ and $I_{t-1}$, a difference value is calculated as:

$$\Delta I_t(x) = \sqrt{(I_t(x)-I_{t-1}(x))^T(I_t(x)-I_{t-1}(x))}. \quad (1.2)$$

From these differences, $MEI'_t$ is calculated as $$MEI'_t(x) = \text{CLAMP}\left(\frac{\Delta I_t(x)}{\sigma_{MEI}}, 1\right), \quad (1.3)$$

with $\sigma_{MEI}$ a scale factor that controls the weight of observed motion energy values. The function CLAMP ensures that all values are clamped to one. Pixels that now show high confidence both in terms of color and motion energy should lead to a high overall confidence in the final confidence image. However, due to noise, pixels that show high motion energy might not spatially correspond to pixels with high color confidence in terms precise pixel location but usually are close to each other if they arise from the same actual body part. Hence, both $CSI'_t$ and $MEI'_t$ need to be smoothed spatially in order to resolve this phenomenon:

$$MEI_t = G_{\sigma_m} \otimes MEI'_t \quad (1.4)$$

and $$CSI_t = G_{\sigma_c} \otimes CSI'_t \quad (1.5)$$

where $G_{\sigma_m}$ and $G_{\sigma_c}$ correspond to suitable (e.g., Gaussian) smoothing kernels and $\otimes$ a convolution of the kernel with the image. These two images $MEI_t$ and $CSI_t$ can now be merged into the combined body part location confidence image $BPLCI_t$ 160, which is described hereinafter.

Figure 9:
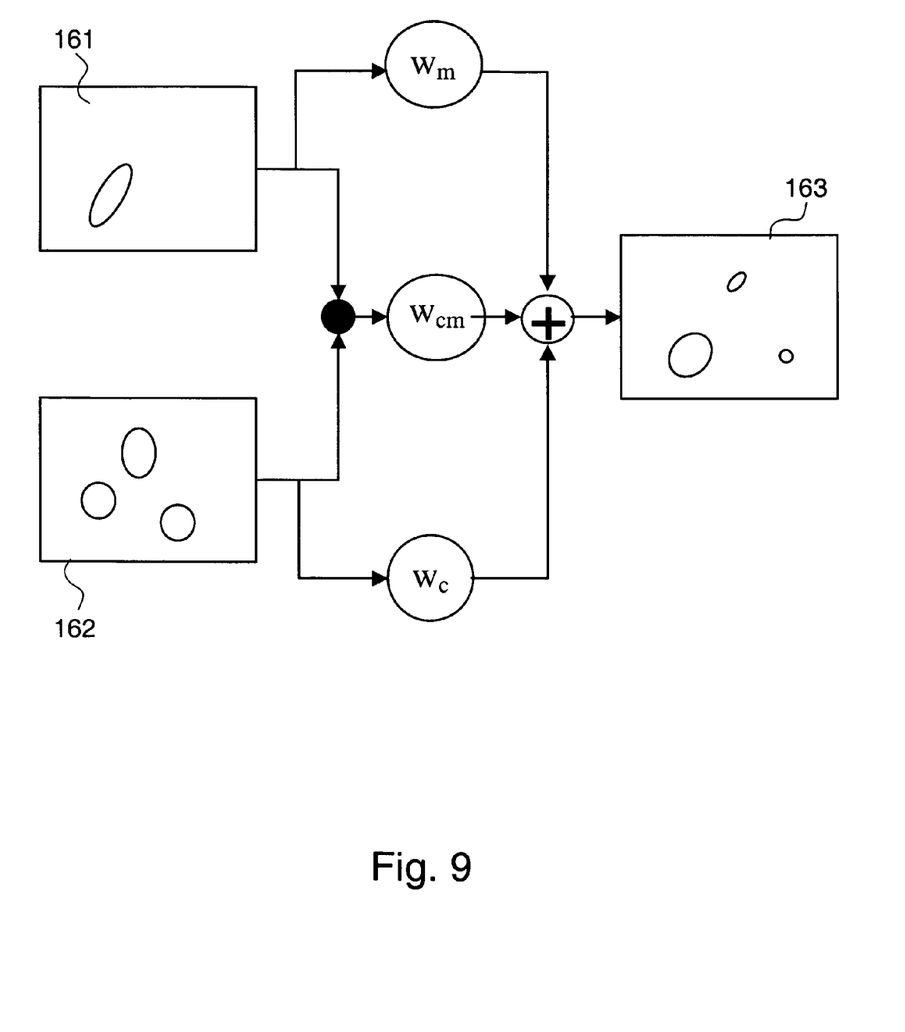
FIG. 9—Confidence Estimation.

FIG. 9 shows the combination of $MEI_t$ and $CSI_t$. For each pixel location x a pixel in $BPLCI_t$ is assigned the value $$BPLCI_t(x) = w_m MEI_t(x) + w_{cm} MEI_t(x) CSI_t(x) + w_c CSI_t(x), \quad (1.6)$$

where the variables $w_m$, $w_{cm}$ and $w_c$ weight the contributions of the different confidence sources. The weights are chosen such that $w_{cm} = 1 - w_c - w_m$.

Equation (1.6) expresses the following logical combination of confidences: A pixel in $BPLCI_t$ should have high confidence, if there is a high confidence that there is motion energy arising from the body part (weighted with $w_m$) or there is a high confidence that there is color match with the body part (weighted with $w_c$) or there is high confidence both in terms of motion and color (weighted with $w_{cm}$).

The BPLCI will in general show high confidence at the actual locations of the user's body part of interest but may also show large values at locations in the image that contain distracters as described in the foregoing description and FIG. 5. One hypothetical location of the body part of interest could now be obtained by choosing the location in the BPLCI that has the highest confidence when compared to all other locations in the image, but many high confidence areas might make the choice of location ambiguous. The best possible scenario is when the user's body part of interest, say the right hand 131, is clearly visible in the view of the camera 101 and the hand is in gentle motion, because this yields high confidences in all three terms in equation (1.6). Hence a user that has experience, knows to always give the system a clear view of the hand and to make gentle hand movements in order to help the system see the hand location as well as possible. However, a user is not inherently experienced and it is difficult and undesirable to explicitly train a user to interact in this manner with the system. Hence this invention presents a method for providing visual feedback in the form of a dynamic visual representation of the BPLCI that helps the user grasp the concept of location ambiguities. Every user consciously or subconsciously wants to optimize the interaction process with the system and will adjust his or her motions and actions to get the best possible result. The visual feedback will, mostly without any conscious knowledge of the user, teach the user to perform actions and motions that makes it as easy as possible for the system to locate the user's hand.

The key aspect of the feedback visualization is to generate and display a, normally large, number of small particles from the BPLCI. Each particle can be viewed to represent a certain amount of confidence that the system has in the user's hand being at the location of the particle. It can furthermore be viewed as a mouse pointer that represents the location of the hand of the user according to the analogy described above. However, a large number of such particles are used. Rather than the location of a single graphical element, the collection of many particles represent the location and confidence of the body part location. The more particles are shown on a certain area of the screen, the higher the confidence of the system that the user's hand is within that area. An optimal situation with the least amount of ambiguity now corresponds to the situation where a large number of particles are located in a very small region on the display, showing that there is little spatial ambiguity about the location, and high confidence. A less optimal situation corresponds to multiple, spread out clouds of particles with low density. Hence a user attempts to perform actions and movements that yield a single highly localized and dense cloud of particles.

Figure 10:
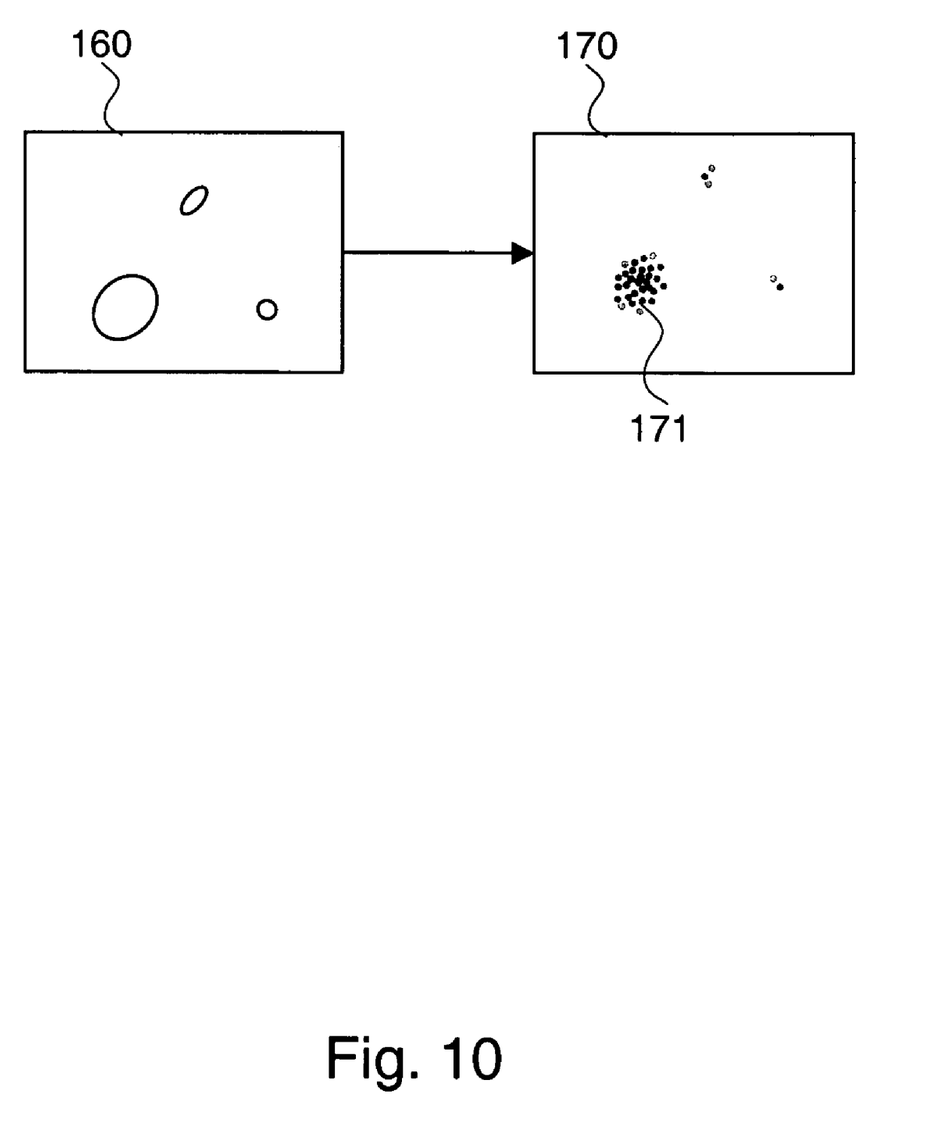
FIG. 10—Creation of Body Part Feedback Particle System Image.

Each particle is a small graphical element that has an intensity value. The intensity can be visually represented in several forms; examples of this are color change, area change (shape and size), or transparency value change. When several particles are shown on the screen, they conform what will be defined as Body Part Feedback Particle System Image (BPFPSI) 170. FIG. 9 illustrates an example BPFPSI that was obtained from the BPLCI 160 used in the previous figures. In this case the particles are small circles whose intensity is represented by color (a color in the grayscale), being black the maximum intensity, and white the minimum. As noted, the distribution and intensity of the particles give a good reference of what the vision system is interpreting. The cloud with more particles 171 represents the moving hand 131, and there are a small number of particles with low intensity in the other body parts that are not taking part on the interaction. At each frame, particles are created randomly from a probabilistic distribution that is obtained from the corresponding BPLCI. The particles are created with an initial intensity value that is also obtained from the BPLCI. The lifespan of the particle can be of several frames; the intensity value is decreased at each frame for every particle, and those that reach zero intensity are eliminated.

The intensity of a particle is defined to be in the range [0,1]. For each pixel x in the BPLCI, at each frame a particle is created with probability:

$$P(p \mid x, t, \phi, \omega) = \frac{n_{BPLCI_t} BPLCI_t(x)}{\phi \omega}$$

where $\omega$ is the number of desired particles per frame in normal interaction conditions; $n_{BPLCI}$ is the number of pixels in the BPLCI; and $\phi$ is the expected total activity when there is a normal interaction with the screen. This value can be calculated in a calibration phase by training the system in normal condition, from a sample of k frames:

$$\phi = \frac{1}{k} \sum_{t=1}^{k} \left[ \sum_{y \in BPLCI_t} y \right]$$

The initial intensity of the created particle p at time t is simply defined as the value of the pixel in the corresponding BPLCI:

$$Y_{p,t} = BPLCI_t(x)$$

The initial position of the particle is the position of pixel x according to the position of the pixel. Once a particle is created, the intensity is decreased over time, until it reaches zero. Particles with zero intensity are eliminated from the BPFPSI. The position of the particle can be slightly changed to produce visual effects, but should remain close to the original position to indicate the location of the body part movement.

Figure 11:
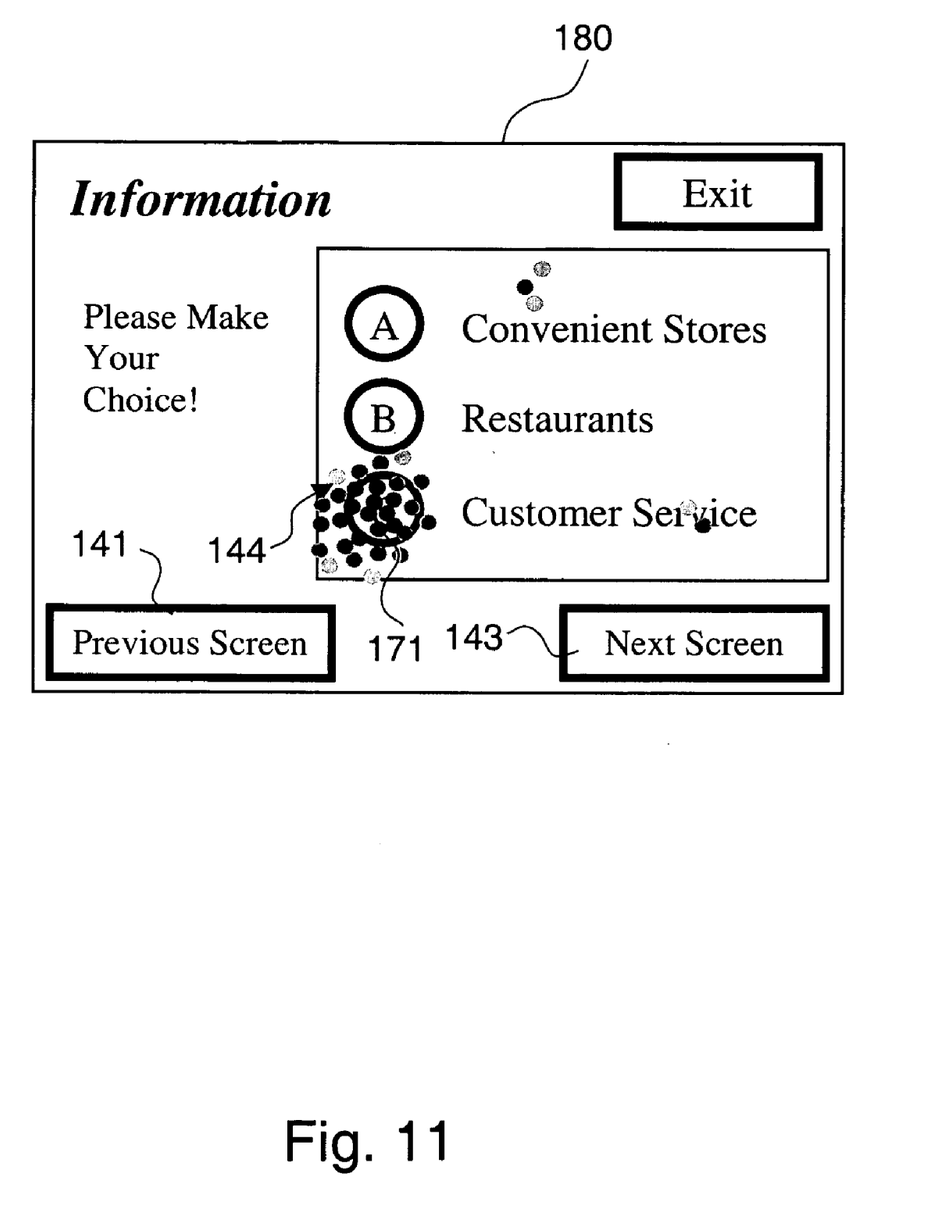
FIG. 11—Feedback visualization.
Figure 12:
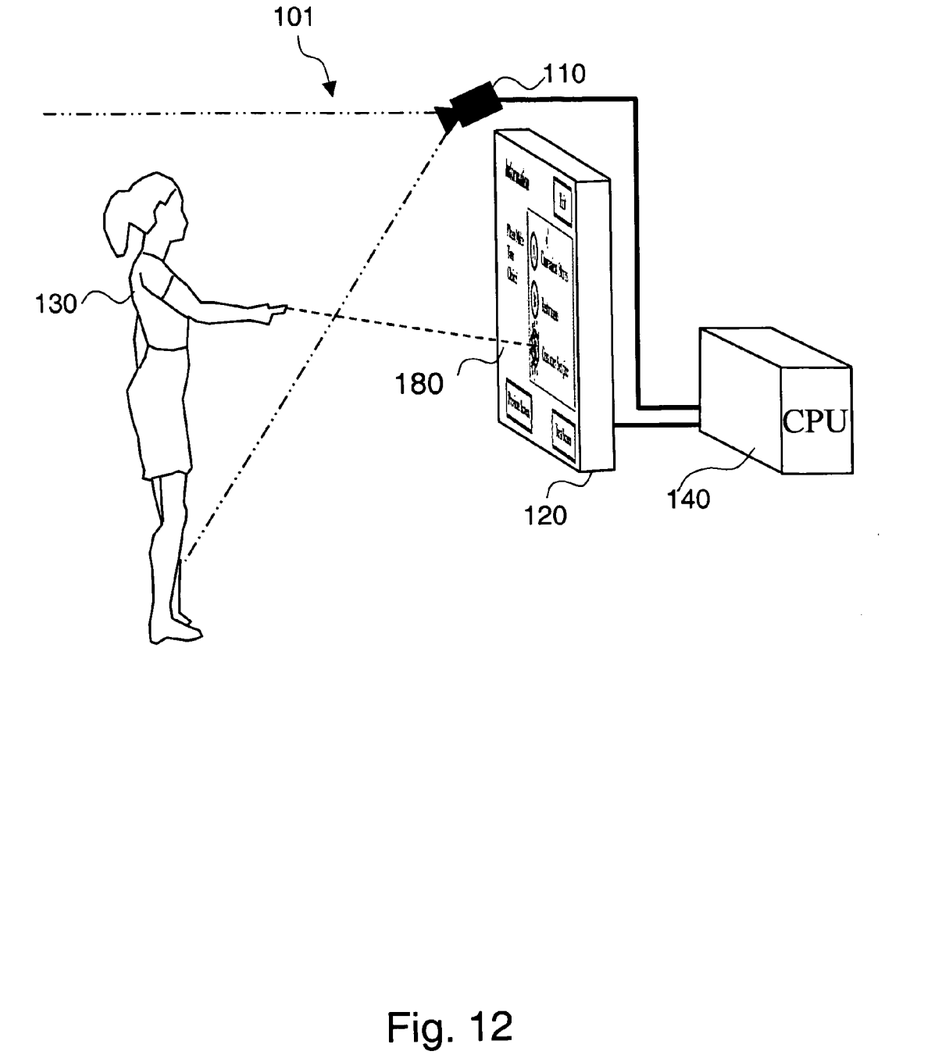
FIG. 12—Interaction with system using feedback visualization.

When the BPFPSI 170 is displayed as visual feedback on the display 120 overlaid on top of information 145 that is displayed to the user 130, the user might see the combined information 180 that is illustrated in FIG. 11. As the user is standing in front of the display 120, he or she might be pointing at one of the buttons 144. The overall interaction experience provided by the feedback mechanism is illustrated in FIG. 12, which shows the main components of the system together with the combined information 180. The body part feedback particle system has a high density at the location that the user is pointing to. Actual interaction between the user and the system is provided by making graphical elements of the information that is displayed on the on the screen sensitive to the presence of feedback particles. If a sufficient number of particles are being detected at a selectable graphical element, say one of the buttons 144, the system assumes that the user wants to select the element (i.e., press one of the displayed virtual buttons 144), which triggers a change in the displayed information. In the preferred illustrative embodiment, the user might after a selection be taken to a screen that displays customer service options.

While the invention has been illustrated and described in detail, in the drawings and foregoing description, such an illustration and description is to be considered as exemplary and not restrictive in character, it being understood that only the preferred embodiment has been shown and described and that all changes and modifications that come within the spirit of the invention are desired to be protected.

We claim:

1. An apparatus for providing a large number of graphical elements to an individual who is interacting with a multimedia terminal, comprising:
    (a) means for capturing a plurality of images from said individual,
    (b) means for calculating a color segmentation image of said individual in said plurality of images,
    (c) means for calculating a motion energy image of said individual in said plurality of images,
    (d) means for calculating a body part location confidence image of said individual by combining said color segmentation image and said motion energy image,
        wherein combining said color segmentation image and said motion energy image is performed by adding and multiplying the images together, and
    (e) means for displaying said large number of graphical elements on said multimedia terminal that correspond to the body part location estimates of said individual in the body part location confidence image, whereby said large number of graphical elements provides said individual with information about what the apparatus senses and the certainty with which the apparatus has sensed said body part location estimates, whereby said large number of graphical elements gives said individual an opportunity to have a better understanding about the capabilities of said multimedia terminal to sense said body movements, and whereby said understanding helps said individual to adapt to the capabilities of said multimedia terminal, leading to an improved interaction experience.

2. The apparatus according to claim 1, wherein said means for displaying said large number of graphical elements on said multimedia terminal further comprises means for varying the density of the graphical elements that are displayed in accordance to the values in said body part location confidence image.

3. The apparatus according to claim 1, wherein said means for calculating said color segmentation image further comprises means for using a statistical color model of said individual's skin color in order to perform the calculation of said color segmentation image.

4. The apparatus according to claim 1, wherein said means for calculating said motion energy image further comprises means for calculating differences between consecutive images in order to perform the calculation of said motion energy image.

5. The apparatus according to claim 1, wherein the apparatus further comprises means for allowing said individual to use his or her body movements to interact with said multimedia terminal without physically coming in contact with said terminal, wherein said large number of graphical elements shows said individual a high density at the location to which said individual is pointing.

6. A method for providing a large number of graphical elements to an individual who is interacting with a multimedia terminal, comprising the following steps of:

(a) capturing a plurality of images from said individual, (b) calculating a color segmentation image of said individual in said plurality of images, (c) calculating a motion energy image of said individual in said plurality of images, (d) calculating a body part location confidence image of said individual by combining said color segmentation image and said motion energy image, wherein combining said color segmentation image and said motion energy image is performed by adding and multiplying the images together, and (e) displaying said large number of graphical elements on said multimedia terminal that correspond to the body part location estimates of said individual in the body part location confidence image, whereby said large number of graphical elements provides said individual with information about the certainty of sensed said body part location estimates, whereby displaying said large number of graphical elements gives said individual an opportunity to have a better understanding about the capabilities of said multimedia terminal, and whereby said understanding helps said individual to adapt to the capabilities of said multimedia terminal, leading to an improved interaction experience.

7. The method according to claim 6, wherein the method further comprises a step of varying the density of the graphical elements that are displayed in accordance to the values in said body part location confidence image.

8. The method according to claim 6, wherein the step of calculating said color segmentation image further comprises a step of using a statistical color model of said individual's skin color in order to perform the calculation of said color segmentation image.

9. The method according to claim 6, wherein the step of calculating said motion energy image further comprises a step of calculating differences between consecutive images in order to perform the calculation of said motion energy image.

10. The method according to claim 6, wherein the method further comprises a step of allowing said individual to use his or her body movements to interact with said multimedia terminal without physically coming in contact with said terminal, wherein said large number of graphical elements shows to said individual a high density at the location to which said individual is pointing.

* * * * *